(12) United States Patent
Gaczewski

(10) Patent No.: US 12,114,623 B2
(45) Date of Patent: Oct. 15, 2024

(54) PLANT POT SUPPORT ASSEMBLY

(71) Applicant: Adam Joseph Gaczewski, Caneadea, NY (US)

(72) Inventor: Adam Joseph Gaczewski, Caneadea, NY (US)

( * ) Notice: Subject to any disclaimer, the term of this patent is extended or adjusted under 35 U.S.C. 154(b) by 0 days.

(21) Appl. No.: 18/111,291

(22) Filed: Feb. 17, 2023

(65) Prior Publication Data

US 2024/0276924 A1    Aug. 22, 2024

(51) Int. Cl.
*A01G 9/04*    (2006.01)

(52) U.S. Cl.
CPC ...................... *A01G 9/04* (2013.01)

(58) Field of Classification Search
USPC .............................. 47/71, 39, 48.5
See application file for complete search history.

(56) References Cited

U.S. PATENT DOCUMENTS

| | | | |
|---|---|---|---|
| 2,206,694 A | 7/1940 | Greene | |
| 2,989,205 A * | 6/1961 | Yaws | A47G 23/03 206/508 |
| 4,339,891 A * | 7/1982 | Bassett | A01G 27/04 47/81 |
| 5,321,909 A | 6/1994 | Loran | |
| 5,341,596 A * | 8/1994 | Kao | A01G 27/04 47/79 |
| 5,782,035 A * | 7/1998 | Locke | A01G 27/00 47/79 |
| 6,766,615 B2 | 7/2004 | Smead | |
| 7,024,818 B2 * | 4/2006 | Maniscalco | A01G 9/02 47/65.5 |
| D555,988 S * | 11/2007 | Fleece | D8/1 |
| D559,051 S * | 1/2008 | Fleece | D8/1 |
| 7,730,666 B2 | 6/2010 | Spray | |
| 7,735,260 B2 | 6/2010 | Holliday | |
| 8,347,552 B1 * | 1/2013 | Johnson, III | A01G 9/042 47/81 |
| D677,994 S * | 3/2013 | Williams | D7/624.1 |
| 9,485,924 B1 * | 11/2016 | Frye | A01G 27/06 |
| 10,485,184 B2 * | 11/2019 | Xing | A01G 9/028 |
| 2005/0091920 A1 | 5/2005 | Smead | |
| 2012/0223208 A1 * | 9/2012 | Tehensky | A47G 23/03 248/346.11 |
| 2022/0174888 A1 * | 6/2022 | Tsuneoka | A01G 9/042 |

FOREIGN PATENT DOCUMENTS

| | | | | |
|---|---|---|---|---|
| JP | 3128782 | * | 1/2007 | ............. A47G 23/03 |
| WO | WO-2020031127 A1 | * | 2/2020 | ............. A01G 27/00 |

* cited by examiner

*Primary Examiner* — Andrea M Valenti
(74) *Attorney, Agent, or Firm* — Boris Leschinsky

(57) ABSTRACT

A plant pot support assembly comprises a saucer and a grate. The saucer, in turn, comprises a flat bottom and a peripheral wall at an elevation such that a cavity is formed. The grate is configured to be placed over the peripheral wall to enable the grate to support a plant pot, wherein water or dirt from the plant pot is accumulated in the cavity below.

8 Claims, 3 Drawing Sheets

PLANT POT SUPPORT ASSEMBLY

TECHNICAL FIELD

The present invention relates generally to plant pots. More particularly, the present invention relates to support assembly for plant pot. In particular, the present invention relates to plant pot support assembly for efficient drainage of excess water and dust.

BACKGROUND

Background description includes information that may be useful in understanding the present invention. However, it is not an admission that any of the information provided herein is prior art or relevant to the presently claimed invention, or that any publication specifically or implicitly referenced is prior art.

Decks and patios are often made of either wood or concrete. Most of us think that they can stand up to almost anything. However, they can be prone to damage from plant drainage. There are a few ways that potted plants without saucers could lead to expensive deck or patio repairs.

If you have a wood deck, plant saucers help protect the boards from excess water that can cause warping, water damage, and rot. Even if the wood is sealed, the sealants may wear off over time, especially if they're exposed to water frequently. However, it is observed that even if the patio etc. is made of concrete, it can still stain from salts and irons flushed out of soils during watering. In addition, allowing water to sit for a long time on your concrete patio can promote mold and mildew growth, which no one wants to deal with. Instead, using our plant saucers designed for plenty of drainage and airflow not only helps keep your plants healthy, but also helps prevent damage to decks and patios.

There is therefore a need in the art to provide a plant pot support assembly for efficient drainage of excess water and dust that seeks to overcome or at least ameliorate one or more of the above-mentioned problems and other limitations of the existing solutions.

SUMMARY

The present invention relates generally to plant pots. More particularly, the present invention relates to a support assembly for a plant pot. In particular, the present invention relates to plant pot support assembly for efficient drainage of excess water and dust.

An aspect of the present invention provides a plant pot support assembly. The assembly may include a saucer and a grate. The saucer, in turn, may have a bottom and a peripheral wall extending from the bottom to an elevation above the bottom so as to form a water-tight cavity with the bottom. The grate may be configured to be placed over and retained above the peripheral wall of the saucer. The grate may be formed from a plurality of interconnected concentric circular elements and configured to support a plant pot on top thereof. The grate allows water and dirt to drop from the plant pot into the interior of the cavity and accumulate therein.

In an aspect, the peripheral wall may have a peripheral lip around a perimeter edge, the peripheral lip creating a recessed area for receiving a plant pot.

In an aspect, the peripheral lip may comprise a first set of notches protruding inwards the cavity.

In an aspect, the grate may be configured with a second set of notches positioned to correspond to and engage with the first set of notches of the peripheral lip to enable engagement and positioning of the grate with the saucer to form the plant pot support assembly.

In an aspect, the bottom may comprise a set of ribs extending towards the peripheral wall and configured to support the grate.

In an aspect, the set of protrusions may have a height that is at least equal to a height of the peripheral wall so as to span a distance between the grate and the bottom of the saucer so as to provide support to the grate.

In an aspect, the saucer or the grate may be constructed of materials selected from a group consisting of wood, plastic, glass, ceramic, clay, and metal.

In an aspect, the saucer and the grate are circular in shape.

In an aspect, the grate is configured with a side notch towards a periphery thereof, the side notch is sized to accept a plant monitor such as a pH meter when positioned across the grate to reach the bottom of the saucer.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth in order to provide a thorough understanding of embodiments of the present invention. It will be apparent to one skilled in the art that embodiments of the present invention may be practiced without some of these specific details.

If the specification states a component or feature "may", "can" "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

The present invention relates generally to plant pots. More particularly, the present invention relates to support assembly for plant pot. In particular, the present invention relates to plant pot support assembly for efficient drainage of excess water and dust.

Figure 1:
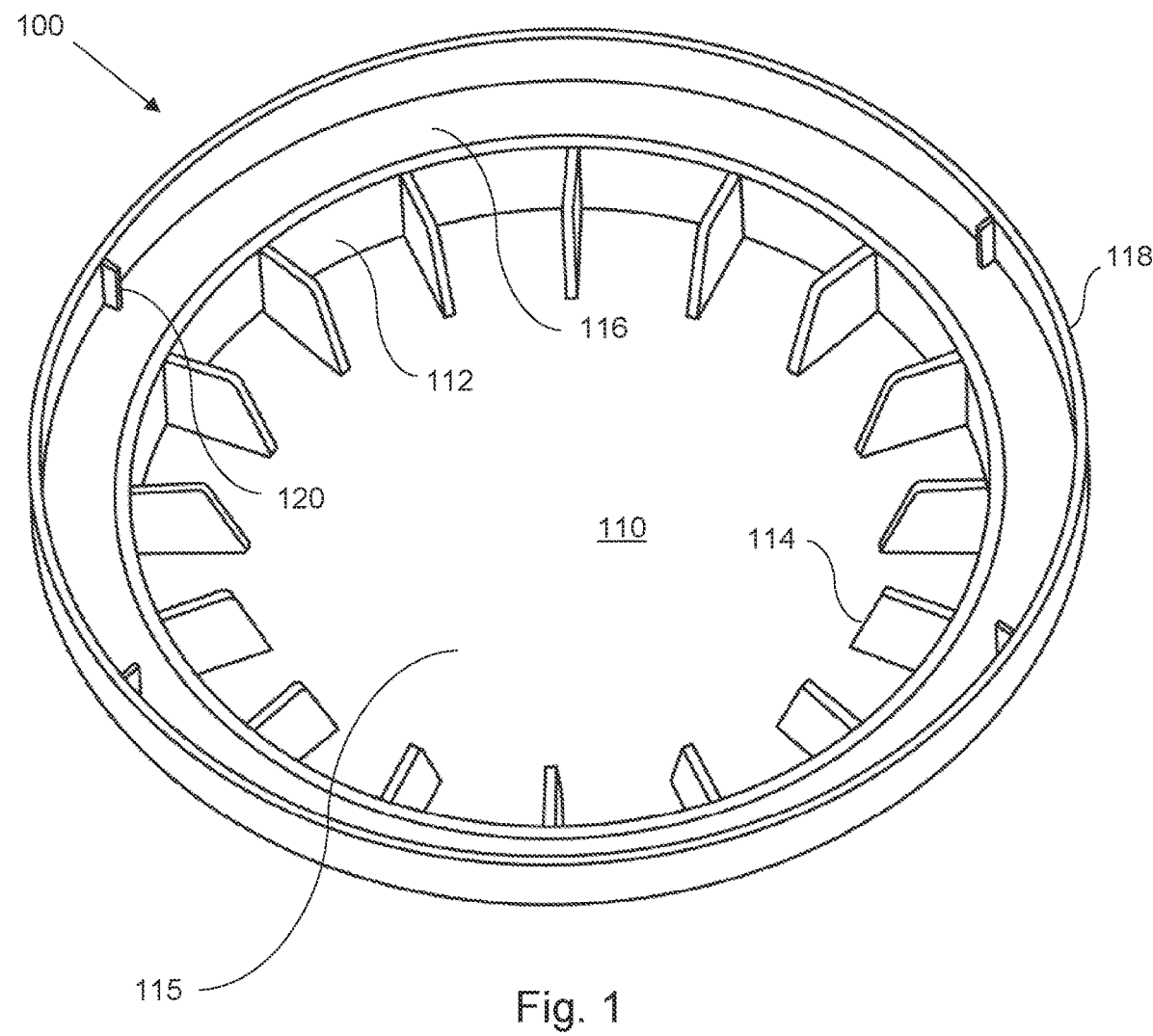
FIG. 1 illustrates an exemplary perspective view of the saucer.
Figure 2:
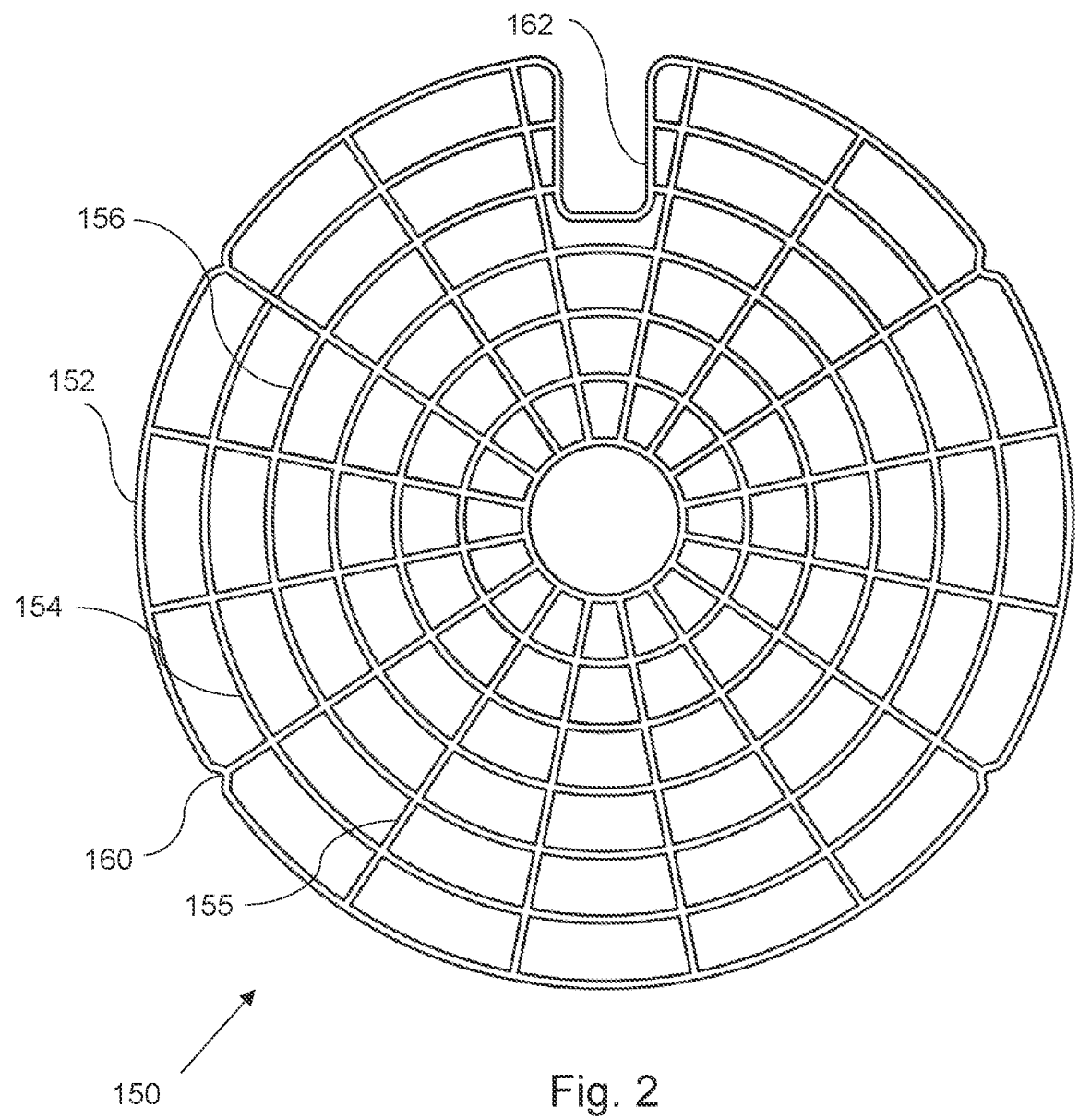
FIG. 2 illustrates an exemplary top view of the grate.
Figure 3:
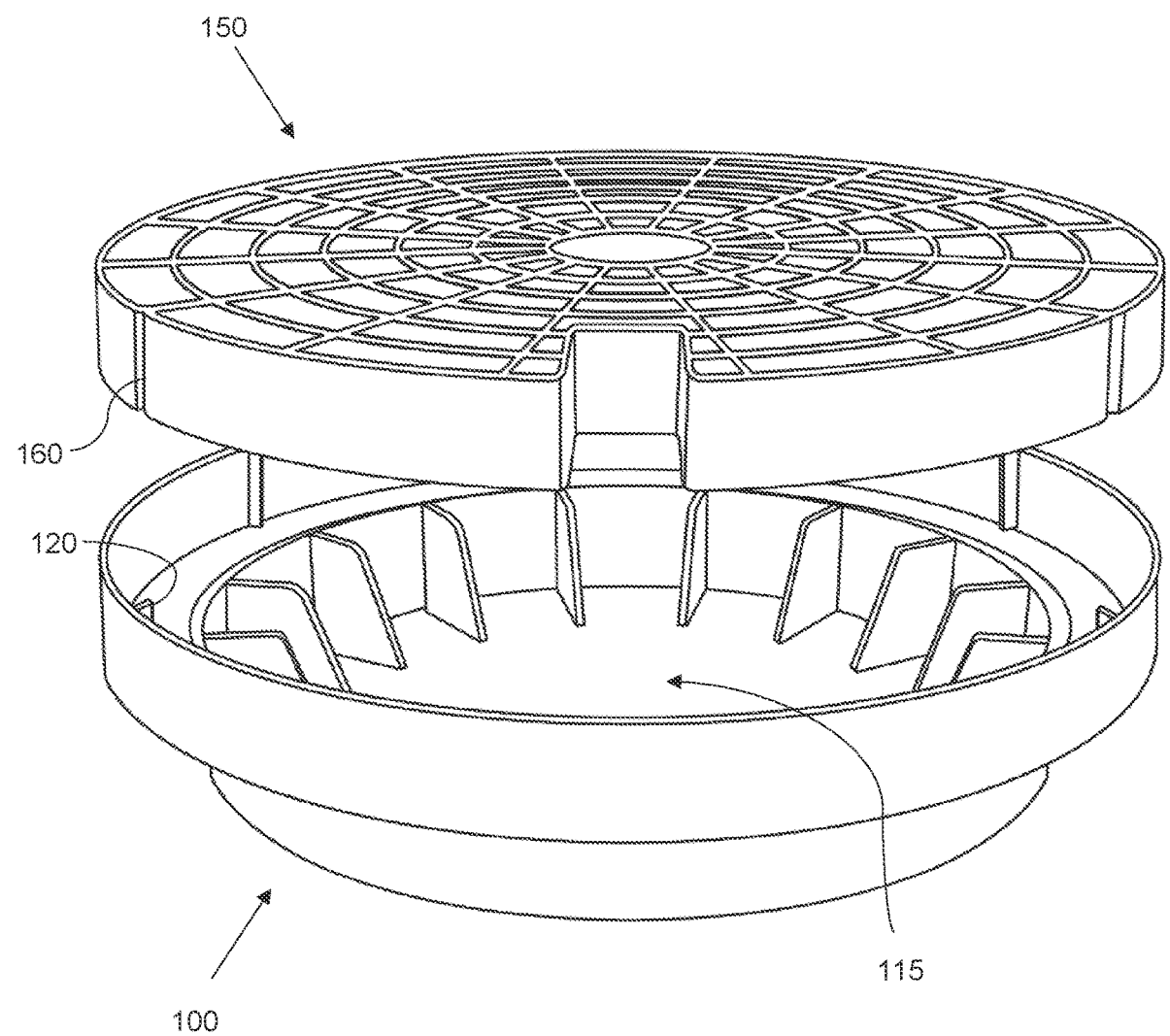
FIG. 3 is a perspective exploded view of the plant pot support assembly.

FIGS. 1 through 3 illustrate a plant pot support assembly. The assembly may include a saucer 100 and a grate 150. The saucer 100 may include a bottom 110 and a peripheral wall 112. The peripheral wall 112 may be located at an outer portion of the bottom 110 and extend to an elevation, as compared to the bottom, such that a cavity 115 is formed. The entire saucer 100 may be made as a single plastic piece, for example, using an injection molding technique. In other embodiments, the saucer may be made of metal, for example, by casting or stamping; or made from other materials, such as glass, clay, wood, ceramic, etc. Importantly, it needs enough structural integrity to support the grate 150 and the one or more plant pots positioned on top thereof without buckling or cracking.

The grate 150 may be configured to be placed over the peripheral wall 112 so as to enable the grate 150 to support a plant pot (not shown) positioned on top thereof, wherein water or dirt from the plant pot is drained through the openings in the grate 150 and accumulated in the cavity 115. The grate may be made from a plurality of parallel, radial, concentric, or otherwise interconnected elements. FIG. 2 shows an example of such an arrangement, where the concentric rings 152, 154, 156, etc. are interconnected by radial spokes 155. The density of the elements forming the grate 150 may be selected to allow free falling of water and dirt therethrough while providing enough structural support for the one or more plant pots located on top of the grate 150.

A variety of materials and manufacturing techniques may be used to make the grate 150. Examples include injection molding or another plastic processing technique to make the grate 150, as seen in the figures. In an alternative arrangement, the grate 150 may be made from a wire mesh. Other materials may also be used, such as wood, ceramic, etc.

The entire assembly and its respective two components 100 and 150 may be circular, rectangular, or of any other general shape suitable to position one, two, or more plant pots on top thereof.

In an aspect, the peripheral wall 112 may have a peripheral lip 116 around a perimeter edge, the peripheral lip 116 creating a recessed area for receiving the plant pot. The lip width may be from about ⅛ of an inch to about 1 inch or any size in between, as the invention is not limited in this regard. A side wall 118 may extend upward from the lip 116 periphery as so to make a guide for positioning a plant pot therein.

In an aspect, the peripheral lip 116 may comprise a first set of notches 120 protruding from the side wall 118 towards the center of the inner portion of the saucer 100. The set of notches may include 1, 2, 3, 4, 5, 6, or more notches, for example, spaced evenly about the circumference of the side wall 118. Four notches 120 are seen in one example illustrated in the figures.

In an aspect, the grate 150 may be configured with a second set of notches 160 sized and positioned to correspond with and engage with the first set of notches 120, when the grate 150 is placed on top of the lip 116. This positioning defines the orientation of the grate 150 within the saucer 100 and prevents it from rotation to avoid a risk of slippage of the plant pot, thereby improving the stability of plant pot support by the assembly of the present invention.

In an aspect, the bottom 110 may comprise a set of reinforcement ribs 114 extending towards and joining the peripheral wall 112 and configured to support the grate 150. The ribs 114 may be evenly spaced out around the periphery of the bottom 110. The ribs 114 may have a height that is at least equal to the height of the peripheral wall 112 so as to span a distance between the grate 150 and the bottom 110 of the saucer 100. In this case, positioning of the grate over the peripheral wall 112 and the top side of all the ribs 114 will spread the pressure more broadly, which would make the entire assembly to be able to support heavier plant pots on top thereof.

In an aspect, the grate 150 may have a side notch 162 located towards the periphery thereof. The side notch 162 may be sized to accept a plant monitor (not shown) when positioned across the grate 150 to reach the bottom 110 of the saucer 100. One example of such a plant monitor is a pH meter that can be used to monitor the environment of the soil in the plant pot.

It is contemplated that any embodiment discussed in this specification can be implemented with respect to any method of the invention, and vice versa. It will be also understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

What claimed is:

1. A plant pot support assembly, said assembly comprising:
　a saucer comprising:
　　a bottom; and
　　a peripheral wall extending from the bottom to an elevation above the bottom so as to form a watertight cavity therewith; and
　a mesh grate comprising a plurality of interconnected elements and configured to be placed over and retained above the peripheral wall of the saucer and configured to support a plant pot, wherein water or dirt from the plant pot is only allowed to fall down from the plant pot to be accumulated in the cavity,
　wherein the peripheral wall has a peripheral lip around a top edge thereof, the peripheral lip creating a recessed area sized and configured for receiving the grate on top thereof, and
　wherein the grate is configured to have a continuous flat shape with a rectangular side notch towards a periphery thereof, the side notch is sized to accept a pH plant monitor when positioned across the grate to reach the bottom of the saucer, thereby facilitating detection of pH in the plant pot,
　wherein the saucer further comprises a side wall extending upward from the peripheral lip periphery and positioned adjacent to an outer edge of the grate other than the side notch thereof.

2. The plant pot support assembly of claim 1, wherein peripheral lip comprises a first set of notches protruding inwards thereof.

3. The plant pot support assembly of claim 2, wherein the grate is configured with a second set of notches sized and positioned to correspond to and engage with the first set of notches of the peripheral lip to enable engagement and positioning of the grate with the saucer to form the plant pot support assembly.

4. The plant pot support assembly of claim 1, wherein the bottom of the saucer further comprising a set of ribs extending towards the peripheral wall and configured to support the grate.

5. The plant pot support assembly of claim 4, wherein the set of ribs is having a height that is at least equal to a height of the peripheral wall so as to span a distance between the grate and the bottom of the saucer.

6. The plant pot support assembly of claim 1, wherein the saucer is constructed of materials selected from a group consisting of wood, plastic, glass, ceramic, clay, and metal.

7. The plant pot support assembly of claim 1, wherein the saucer and the grate are circular in shape.

8. The plant pot support assembly of claim 7, wherein the grate is having a plurality of interconnected concentric circular elements.

* * * * *